United States Patent
Jesenko

(10) Patent No.: US 11,244,501 B2
(45) Date of Patent: Feb. 8, 2022

(54) COMPUTER-IMPLEMENTED METHOD FOR DETECTING THREE-DIMENSIONAL SURFACE GEOMETRIES

(71) Applicant: a.tron3d GmbH, Klagenfurt am Woerthersee (AT)

(72) Inventor: Juergen Jesenko, Riegersdorf (AT)

(73) Assignee: A.TRON3D GMBH, Klagenfurt am Woerthersee (AT)

( * ) Notice: Subject to any disclaimer, the term of this patent is extended or adjusted under 35 U.S.C. 154(b) by 69 days.

(21) Appl. No.: 16/660,903

(22) Filed: Oct. 23, 2019

(65) Prior Publication Data
US 2020/0167994 A1 May 28, 2020

(30) Foreign Application Priority Data
Nov. 27, 2018 (EP) ..................................... 18208734

(51) Int. Cl.
| | | |
|---|---|---|
| G06T 7/11 | (2017.01) | |
| G06T 17/00 | (2006.01) | |
| G06T 17/10 | (2006.01) | |
| G06T 7/187 | (2017.01) | |
| G06F 17/18 | (2006.01) | |

(52) U.S. Cl.
CPC ............. *G06T 17/10* (2013.01); *G06F 17/18* (2013.01); *G06T 7/11* (2017.01); *G06T 7/187* (2017.01); *G06T 17/00* (2013.01); *G06T 2207/20084* (2013.01); *G06T 2207/30036* (2013.01); *G06T 2210/41* (2013.01)

(58) Field of Classification Search
CPC .............. A61C 7/002; A61C 2007/004; G06T 2207/30036
See application file for complete search history.

(56) References Cited

U.S. PATENT DOCUMENTS

| | | | |
|---|---|---|---|
| 9,544,577 B2 | 1/2017 | Blassnig et al. | |
| 2015/0024336 A1 | 1/2015 | Blassnig et al. | |
| 2018/0028063 A1* | 2/2018 | Elbaz | H04N 13/246 |
| 2018/0270474 A1* | 9/2018 | Liu | A61B 6/508 |
| 2018/0303581 A1* | 10/2018 | Martz | A61C 7/002 |
| 2019/0026900 A1* | 1/2019 | Fergie | G06T 7/90 |
| 2019/0333627 A1* | 10/2019 | Johnson | G06N 3/0481 |
| 2019/0357997 A1* | 11/2019 | Shi | A61C 9/0046 |
| 2020/0342597 A1* | 10/2020 | Chukka | G06K 9/6256 |

FOREIGN PATENT DOCUMENTS

JP    2013-128694 A    7/2013

OTHER PUBLICATIONS

European Search Report, dated May 13, 2019, from corresponding European patent application No. 18 20 8734.

* cited by examiner

*Primary Examiner* — Ryan McCulley
(74) *Attorney, Agent, or Firm* — Nixon & Vanderhye

(57) ABSTRACT

In a computer-implemented method for detecting three-dimensional surface geometries of real intraoral structures, two-dimensional images of intraoral structures are converted into three-dimensional virtual surface geometries. Pixels of the two-dimensional images are each partitioned into segments and each segment is assigned a label. Each segment of a two-dimensional image corresponds to at least one type of real intraoral structure. There are at least two types of segment; each type of segment has a different label and at least one of the labels represents teeth and tooth-like structures.

19 Claims, 1 Drawing Sheet

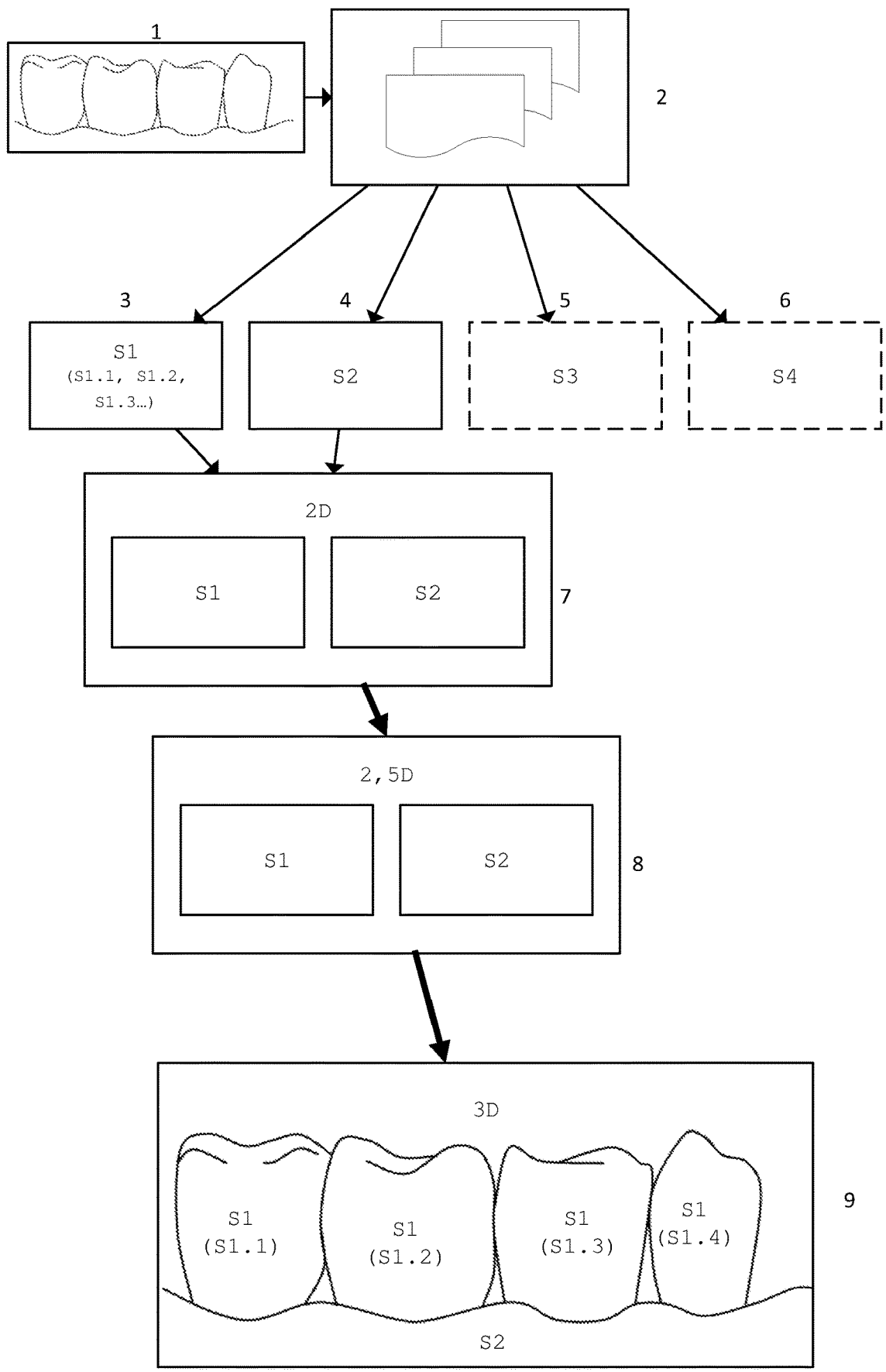

COMPUTER-IMPLEMENTED METHOD FOR DETECTING THREE-DIMENSIONAL SURFACE GEOMETRIES

BACKGROUND OF THE INVENTION

Field of the Invention

The invention relates to a computer-implemented method for detecting three-dimensional surface geometries of real intraoral structures, in which two-dimensional images of intraoral structures are converted into virtual three-dimensional surface geometries.

Description of the Related Art

Particularly in the field of dental treatments, there are many systems for optically detecting the three-dimensional surface geometry of objects. These are used, for example, when producing prostheses, crowns, inlays, or the like, are used for providing assistance when monitoring orthodontic treatments and/or providing general assistance in the observation and detection of intraoral structures. The large advantage of such optical systems lies in the fact that on the one hand, they are neither invasive, nor uncomfortable, like the dental impressions frequently used in conventional dentistry, and they also do not present a potential hazard to the patient as can be the case, for example, with radiation-based methods such as X-rays. On the other hand, after detection, the data are available in electronic form and can be easily stored, for example for later comparisons, or also transmitted, for example from a dentist to a dental laboratory.

One of the essential tasks involved in improving methods for optical detection of surface geometries is improving the precision of the detected surface geometry and the speed of the detection. For this purpose, it is primarily desirable to achieve a correct and rapid matching between the individual two-dimensional, 2.5-dimensional, and/or three-dimensional images and/or segments.

SUMMARY OF THE INVENTION

The object of the invention, therefore, is to improve the processing of two-dimensional images for producing virtual three-dimensional surface geometries.

This object is attained according to the invention by means of a computer-implemented method with the features of claim 1.

As defined by the invention, an image can be a single two-dimensional shot or can be two or more two-dimensional shots that are combined into one image.

The usual sequence in optical 3D scanning is that first, two-dimensional images are recorded, then based on these images, relief-like depth information is obtained, which is considered to be 2.5D, and then at least two 2.5D data sets are combined to form virtual 3D objects. The last step usually requires at least one pair-by-pair intersection of the 2.5D data sets. A proven method for converting 2D data into 3D data, which can also be used with the invention, is known, for example, from U.S. Pat. No. 9,544,577 B2.

In general, with scanners that are not positioned in a constrained spatial relationship to the object that is to be scanned, it is customary and necessary to determine the camera movement between individual images. In this case, it is possible to determine either the movement of the camera in the literal sense or merely the mathematical translation (translation vector) and rotation (rotation matrix) that are necessary in order to integrate the new depth information into the existing virtual three-dimensional surface geometries (the translation vector and the rotation matrix yield the translation matrix). Often, the terms "camera movement" and "translation matrix" are used interchangeably since they are equivalent for the data processing.

Stated very simply, for each 2.5D data set, a determination is made as to the position that the sensor was in relative to the intraoral structure recorded and as to the viewing angle at which the underlying two-dimensional image was recorded. The stringing together of sensor positions or information about how a sensor has moved from one image a subsequent image, together with the depth information, yields the virtual three-dimensional surface geometry. Thus for each region of the virtual surface geometry, it is also possible to say how often it was "seen" by a sensor.

If labels that have been assigned according to the invention are also included in addition to the information of how often a particular region of the virtual three-dimensional surface geometry has been "seen," it is also possible to glean information about how often a particular label has been "seen" in a particular region.

The fact that a region is "seen" is comparable to human sight in this context and means that a sensor has detected an image of a structure and that the detected image has been at least partially interpreted. The interpretation can include both the segmenting and also the determination of depth information.

According to a particularly preferred implementation of the invention, the labeling takes place by means of an artificial intelligence, the artificial intelligence having been trained to detect at least teeth in digital images. The artificial intelligence is preferably a neural network, in particular a convolutional neural network.

Before the generation of the three-dimensional surface geometries, the pixels, in addition to their already existing information, are automatically classified into at least two different classes and are provided with corresponding labels, with one of the labels representing teeth and tooth-like structures.

The information already present in a pixel can, for example, be the brightness of the pixel and the coordinates of the pixel in the image.

As defined by the invention, a pixel can also be representative of a plurality of pixels, for example if the two-dimensional image has been compressed before the segmenting.

It is possible that only one kind of intraoral structure, for example only a tooth or only the gums, is depicted in an image. In this case, the image in the sense of the invention is partitioned into only one segment and all of the pixels of the image are allocated to one segment and provided with a label.

In this context, "teeth and tooth-like structures" can include anything that visually corresponds to a tooth. This can, for example, include, but is not limited to, structures from the following group: teeth, crowns, implants, inlays, fillings, bridges, and the like.

So that a segment represents teeth and tooth-like structures, in the simplest implementation, the teeth and tooth-like structures can be detected and, for example, classified as "tooth."

But it is also possible, for example, to detect and classify all of the regions that are not teeth. The remaining label "remainder" in this case likewise represents the teeth.

The procedure of having the artificial intelligence draw a distinction between "tooth" and "not tooth" already on the two-dimensional level does indeed constitute an additional step, which is why the person skilled in the art would expect for this to slow down the overall method, but the procedure results in such a plurality of advantages that the "lost" time can be made up again in the subsequent processing.

The time saved can be primarily explained by the smaller number of erroneous matchings that then have to be discarded. Matchings are basically pairings between two or more components of at least two two-dimensional images about which a spatial relationship is known or determined. Depth information can be obtained from a two-dimensional matching with a known or determined spatial relationship. The components of the two-dimensional images in this case are in direct relation to the real objects that are depicted in the images. It is important here that each component that is used to obtain depth information can be detected or determined as uniquely as possible. In other words: a high degree of certainty that two paired (or matched) elements in two two-dimensional images show the same region on the same object is decisive for the quality of the overall scanning procedure. This certainty increases if erroneous matchings can be ruled out. The components of the two-dimensional images can be one or more pixels in size.

If the two-dimensional images are classified as is provided according to the invention and if regions and/or pixels of the images are labeled in accordance with classifications, then matchings can be limited so that they only take place within the same label. This does not completely rule out erroneous matchings, but it can avoid a large percentage of the erroneous matchings. Thus for example, teeth in one image and gums in another image can no longer be inadvertently matched to each other.

It is preferable if the labels assigned in the two-dimensional images/regions are also present in subsequent data levels, i.e. in the form of 2.5D information and 3D information.

If the 2.5D information has segments, then this can simplify the combining of 2.5D data sets to form 3D surfaces since here as well, it is necessary to search for reference points, and limiting the possible reference points to those reference points that have the same labels minimizes error sources and thus accelerates the procedure.

If the labels are retained into the three-dimensional data level, then this can be used for other steps such as a coloring of the 3D model. It is thus possible, for example, for all surfaces with the class "tooth" to be colored white and for all of the remaining surfaces to be colored pink. In a preferred modification of the invention, it is thus provided, for example, that the segments are allocated colors and that regions of the generated three-dimensional surface geometry are colored in accordance with the labels of the corresponding segments of the digital images.

According to the invention, the segments correspond to types of intraoral structures. According to a preferred modification of the invention, the types of structures can, for example, be soft tissue (such as the tongue, cheeks, and the like),
hard tissue (such as the gums or palate),
tooth-like structures (such as teeth or dentures that are modeled on teeth),
artificial structures (such as parts of braces, dentures, which are recognizable as such, parts of reconstructive preparations such as abutments or the like),
transitions between individual types of structures, or
anything that cannot be identified (e.g. background or teeth too damaged by cavities).

Depending on how the neural network has been previously trained, it is possible to identify all of the above-mentioned types or also only selected types. All of the unidentified types can then be combined, for example, into another type called "remainder." A segment can also comprise several types of intraoral structures, for example "gums and soft tissue" or "teeth, tooth-like structures, and artificial structures." The number of types of different segments resulting from the segmenting in this case affects both the complexity of the training of the neural network and the complexity (but also the precision) of the subsequent scanning procedure.

Through the assignment of other labels, it is possible to detect more surfaces, thus further accelerating and improving the method. The remaining regions can, for example, be the background, but can also be transition regions in which the artificial intelligence was unable to assign any of the other labels.

In reality, it has turned out that it is particularly advantageous if the segments "tooth," "gums," "transition," and "remainder" are identified. In this case, for example, the segments "tooth," "gums," and "transition" can be identified and labeled and all of the unassigned regions of the images are automatically labeled as "remainder."

Naturally, "gums" and "background," for example, could also be identified and everything else could be labeled as "tooth." Which priorities are set here in the training of the neural network depends on the user and has no influence, or only a negligible one, on the functionality of the invention.

In another preferred modification of the invention, in addition to the respective class, the labels include additional information. This information can, for example, be color information that has resulted in the assessment "tooth" or "gums."

In a preferred modification of the invention, in addition to the type of intraoral structure, the labels also include a probability that indicates how probable it is that a correct label has been assigned. In another preferred modification, this probability can flow into a weighting of the three-dimensional virtual surface geometry.

If the 3D information is stored, for example, in a voxel-based notation, then the individual voxels can contain weightings. The probabilities can also flow into this weighting and thus amplify the advantage of such weightings. Further explanations about how weightings work and what advantages they bring for the 3D scanning can be found, for example, in US 2015/0024336 A1.

According to another modification of the invention, the images are recorded while the structures are sequentially illuminated with one of at least two, preferably four, types of light. This produces groups of images that each depict intraoral structures illuminated in a different type of light. This allows information to be gleaned that can be valuable for both the generation of virtual three-dimensional surface geometries, and also for the segmenting.

A first possibility and preferred implementation of the invention is for example that the images are recorded while the structures are sequentially illuminated with one of three types of light and the three types of light are light that is projected in different colors, preferably red, green, or blue. It is thus possible to glean color information even with a monochrome sensor.

It is thus possible, for example in another preferred implementation of the invention, for the segmenting to be carried out by the neural network based on a reflected light intensity as a function of the projected color. For this purpose, use can be made of the fact that teeth, because of their opalescent properties, reflect blue light, which penetrates less deeply, differently than for example red light, or the fact that gums in red light appear different than they do in green light.

In another preferred implementation of the invention, one type of light is projected onto the intraoral structures in a structured way, particularly in the form of a pattern. In this case, structured light can be particularly helpful in obtaining particularly precise geometric surface information. For example, structured light can exist in the form of regular or irregular patterns, which are projected onto the intraoral structures, for example as uniform stripes or randomly distributed points. Structured light, however, can also be laser light, for example, with the speckles that strike the illuminated objects being used to improve the geometrical surface information.

In another quite particularly preferred implementation of the invention, a region of the virtual three-dimensional surface geometry is updated by means of data from pixels, which correspond to the region and are from at least one two-dimensional image, and a detection is carried out as to how often the pixels have a particular label. It is thus possible with regard to every region to glean information as to how often the region has been updated with a particular label.

From this information, it is possible to obtain various additional information that makes it possible to glean information about the degree of probability that the segmenting has occurred correctly or that simply enables a more robust scanning procedure.

Other preferred implementations of the invention are the subject of the remaining dependent claims.

BRIEF DESCRIPTION OF THE DRAWINGS

A preferred implementation example of the invention is described in greater detail below based on the drawings. In the drawings:

FIG. 1 shows a diagramed depiction of an exemplary method according to the invention.

DESCRIPTION OF THE PREFERRED EMBODIMENTS

In the depiction in FIG. 1, first a series of two-dimensional images 2 is made of intraoral structures 1. Depending on the method with which the two-dimensional images 2 are converted into three-dimensional surface information, it is theoretically also possible for a single two-dimensional image 2, which is converted into three-dimensional surface information, to profit from the advantages of the method. In the context of the example shown, however—without limiting the invention to this—there is assumed to be a series of at least two successive images 2.

The two-dimensional images 2 are then partitioned pixel-by-pixel into segments 3, 4, 5, 6. There are different types of segments, with each type of segment corresponding to one type of intraoral structure. In the simplest implementation, it is possible for example to distinguish between the types "teeth and tooth-like intraoral structures" and "remainder." In enhanced implementations, it is also possible, for example, to consider "gums," "soft tissue," "transition between gums and teeth," and the like as separate types of intraoral structures and as corresponding types of segments 3, 4, 5, 6.

In a preferred implementation of the invention, the individual teeth and tooth-like objects are each considered to be a separate segment with a separate label. In this connection, no notice is taken of which tooth occupies which position in the mount; instead, it is simply assumed that two tooth segments, which are for example separated by a transition segment or a remainder segment, each also correspond to two separate teeth or tooth-like structures.

Tooth-like structures or objects as defined by the invention are all intraoral structures that are positioned in the region of the teeth or in lieu of the teeth. Non-exhaustive examples of these in this case include crowns, implants, and inlays as possible tooth-like objects or structures, which are not themselves teeth, but are treated as teeth for the method according to the invention.

After the two-dimensional images 2 have been partitioned into two (teeth, remainder) or more segments 3, 4, 5, 6 (teeth, gums, soft tissue, transitions, etc.), a selection is carried out as to the segments with which additional calculations are to be carried out in the subsequent steps.

The segments 5, 6 with which no other calculations are to be carried out can be discarded, but they can also remain stored without further processing and used as needed for other processes.

The selected segments 7 can then be used to generate 2.5D surfaces 8. In this procedure, it is important that the respective surface regions of the 2.5D surfaces 8 continue to correspond to the previously selected segments 7 and this, in accordance with the labels assigned in the two-dimensional images 2.

The method of converting the two-dimensional images 2 to the 2.5D surfaces 8 can be freely selected by the person skilled in the art and essentially depends on the selected method with which the two-dimensional images 2 were generated. If the images were generated stereometrically, then it is possible to determine disparities between image pairs. If the images 2 were generated with simultaneous projection of a known pattern, then in each individual image, the surface structure can be determined based on the distortion of the pattern. These two possibilities are mentioned here merely as examples. The person skilled in the art can freely choose from among the available methods that are sufficiently known and described.

It is advantageous that in this step, it is already possible to achieve savings in computing resources since only the pixels in the two-dimensional images that also have the corresponding labels are used for the conversion.

As is also the case with the known methods in the prior art, the next step of the method consists of bringing the individual 2.5D surfaces into relation to one another and/or to an already existing virtual three-dimensional surface geometry and combining or adding them. This can be done using the ICP algorithm, for example, which is sufficiently known to the person skilled in the art. Extensive explanations for the step known from the prior art can be found, for example, in EP 2 672 461 A1.

What is new relative to the prior art is the special possible actions as well as the advantages that ensue from the 2.5D surfaces, which are partitioned into segments, since in this step, a search is carried out for surfaces, which at least partially, can be essentially mapped onto one another. In this case, "partially" means that the individual surfaces do not have to completely overlap. The fact that the surfaces can be essentially mapped onto one another includes the fact that in the context of measurement errors, the surfaces generally cannot be mapped onto one another with 100% accuracy.

The adaptation of the method according to the invention is accompanied by two significant advantages or improvements relative to the prior art. On the one hand, it is not necessary to fit in the surfaces that are neither teeth nor gums, for example an inadvertently recorded tongue or soft tissue beyond the gums since no 2.5D surfaces are generated for these. On the other hand, erroneous matchings or imaging can be minimized because of the limitation that only surfaces that represent teeth are mapped onto surfaces that represent teeth and those surfaces that represent gums are mapped onto surfaces that represent gums.

Preferably, for the virtual three-dimensional surface geometries 9, it also remains noted which regions (and now surfaces) were labeled as which segments in the original two-dimensional images. According to another modification of the invention, this information can be used for other optimizations of the virtual three-dimensional surface geometries 9.

One such optimization can, for example, be a coloring of the model. To accomplish this, the teeth can be colored using white and pink colors that usually correspond to intraoral structures. For example, statistical color averages or color values measured directly on the intraoral structures can be used for this.

In another preferred implementation of the invention, not only are the teeth as a whole considered as a separate segment S1, but also each tooth is considered as a separate segment S1.1, S1.2, S1.3, S1.4. To achieve this, the system only has to recognize that it is a tooth, but not which tooth it is (i.e. for example: second incisor, upper left). Since the two-dimensional images are usually generated as a sequence based on the movement of the intraoral scanner, in two successive images, it can be assumed that there is at least an intersection of the images at least in some regions. A tooth segment in one image is assumed to be the same tooth in a subsequent image until a transition zone between two tooth segments is detected. Starting from this point, it is then assumed that it is a different tooth.

A thus enhanced method therefore only detects the "first tooth seen," "second tooth seen," etc., but not whether it is, for example, an incisor or whether it is positioned in the upper or lower jaw.

Virtual three-dimensional surface geometries based on such an enhanced segmenting can be used, for example, to mask out individual teeth in the model or for example also to individually move teeth as part of orthodontic simulations.

REFERENCE NUMERAL LIST 1 intraoral structures
2 two-dimensional images
3 segment S1 (tooth)
4 segment S2 (gums)
5 segment S3 (transition)
6 segment S4 (remainder, soft tissue)
7 selected segments (3, 4)
8 2.5D surfaces
9 virtual three-dimensional surface geometries

The invention claimed is:

1. A computer-implemented method for detecting three-dimensional surface geometries of real intraoral structures, comprising:
    starting with a series of two-dimensional images of an intraoral structure, converting the two-dimensional images of the intraoral structures into a virtual three-dimensional surface geometry of the intraoral structure, wherein said converting step comprises
    pixel-by-pixel partitioning of the pixels of the two-dimensional images into at least one segment, each segment being a two-dimensional image segment,
    assigning each segment a label,
    wherein, each segment corresponds to at least one type of real intraoral structure, there are at least two types of segments, each type of segment has a different label, and at least one of the labels represents teeth and tooth-like structures, and
    selecting at least the segments of at least one label to generate the virtual three-dimensional surface geometry of the intraoral structure,
    wherein the types of intraoral structures having different labels include at least one of the following types:
    soft tissue, including tongue and cheeks,
    hard tissue, including gums,
    tooth-like structures, including teeth or dentures that are modeled on teeth,
    artificial structures,
        transitions between individual types of structures including separating teeth, and
    remainders separating two teeth, and
    wherein,
    for each recorded tooth, a separate label is assigned,
    labels are assigned to the transitions and the remainders between the recorded teeth,
    the labels assigned to the transitions and the remainders between the recorded teeth and to each recorded tooth are selected to generate the virtual three-dimensional surface geometry of the intraoral structure, the virtual three-dimensional surface geometry showing each recorded tooth,
    the method using the labels assigned to the transitions and the remainders between the recorded teeth to position the recorded teeth with respect to each other in the virtual three-dimensional surface geometry.

2. The computer-implemented method according to claim 1, wherein the segmenting takes place by means of an artificial intelligence.

3. The computer-implemented method according to claim 1, wherein for each recorded tooth, a separate label is assigned, and the labels assigned to each recorded tooth are selected to generate the virtual three-dimensional surface geometry of the intraoral structure, the virtual three-dimensional surface geometry showing each recorded tooth.

4. The computer-implemented method according to claim 1, wherein the at least one label is selected and only the segments with the selected label(s) are used to generate the virtual three-dimensional surface geometry of the intraoral structure.

5. The computer-implemented method according to claim 1, wherein the labels are also retained in the generated virtual three-dimensional surface geometry.

6. The computer-implemented method according to claim 5, wherein the retained labels are used for optimizations including a coloring of the model.

7. The computer-implemented method according to claim 1, wherein in addition to the type of intraoral structure, the labels also include a probability that indicates how probable it is that a correct label has been assigned.

8. The computer-implemented method according to claim 7, wherein the probability of the label flows into a weighting of the virtual three-dimensional surface geometry.

9. The computer-implemented method according to claim 1, wherein the images are recorded while the structures are sequentially illuminated with one of at least two types of light.

10. The computer-implemented method according to claim 9, wherein the images are recorded while the structures are sequentially illuminated with one of three types of light and the three types of light are light that is projected in different colors.

11. The computer-implemented method according to claim 9, wherein the segmenting is carried out by a neural network based on a reflected light intensity as a function of a projected color.

12. The computer-implemented method according to claim 9, wherein one type of light is projected onto the intraoral structures in a structured way, including in the form of a pattern.

13. The computer-implemented method according to claim 1, wherein the images are taken using a monochrome sensor.

14. The computer-implemented method according to claim 1, wherein a region of the virtual three-dimensional surface geometry is updated by means of data from pixels, which correspond to the region and are from at least one two-dimensional image, and a detection is carried out as to how often the pixels have a particular label.

15. The computer-implemented method according to claim 14, wherein the detection of the label is carried out for each label.

16. The computer-implemented method according to claim 1, wherein the segmenting takes place by means of an artificial intelligence and the artificial intelligence is a neural network.

17. The computer-implemented method according to claim 1, wherein the segmenting takes place by means of an artificial intelligence and the artificial intelligence is a convolutional neural network.

18. The computer-implemented method according to claim 1, wherein plural labels are selected including the at least one label representing teeth and tooth-like structures and only the segments with the selected labels are used to generate the virtual three-dimensional surface geometry of the intraoral structure, the intraoral structure being the teeth or the tooth-like structure.

19. A computer-implemented method for detecting three-dimensional surface geometries of real intraoral structures, comprising:
   starting with a series of two-dimensional images of an intraoral structure, converting the two-dimensional images of the intraoral structure into a virtual three-dimensional surface geometry of the intraoral structure, wherein said converting step comprises
   pixel-by-pixel partitioning of the pixels of the two-dimensional images into at least one segment, each segment being a two-dimensional image segment,
   assigning each segment a label,
   wherein, each segment corresponds to at least one type of real intraoral structure, there are at least two types of segments, each type of segment has a different label, and at least one of the labels represents teeth and tooth-like structures, and
   selecting at least the segments of at least one label to generate the virtual three-dimensional surface geometry of the intraoral structure, wherein,
   segments having different labels include:
   tooth-like structures positioned in a region of the teeth or in lieu of the teeth, the tooth-like structures including crowns, implants, and inlays,
   transitions between individual teeth and the tooth-like structures,
   remainders separating teeth and the tooth-like structures,
   for each recorded tooth, a separate label is assigned,
   for each recorded tooth-like structure, a separate label is assigned,
   labels are assigned to the transitions and the remainders,
   the labels assigned to the transitions and the remainders, to each recorded tooth, and to each recorded tooth-like structure are selected to generate the virtual three-dimensional surface geometry of the intraoral structure, the virtual three-dimensional surface geometry showing recorded teeth and recorded tooth-like structures,
   the method using the labels assigned to the transitions and the remainders to position the recorded teeth and the record tooth-like structures with respect to each other in the virtual three-dimensional surface geometry.

\* \* \* \* \*